United States Patent
Upmeyer

(12) 
(10) Patent No.: US 6,241,453 B1
(45) Date of Patent: Jun. 5, 2001

(54) SATELLITE VEHICLE FOR MOVING PALLET UNITS IN AND OUT OF STORAGE WITH TRANSPORTATION VEHICLES

(75) Inventor: Ulrich Upmeyer, Borgholzhausen (DE)

(73) Assignee: Westfalia-WST-Systemtechnik GmbH & Co. KG, Borgholzhausen (DE)

(*) Notice: Subject to any disclaimer, the term of this patent is extended or adjusted under 35 U.S.C. 154(b) by 0 days.

(21) Appl. No.: 09/424,974

(22) PCT Filed: Mar. 29, 1999

(86) PCT No.: PCT/EP99/02125

§ 371 Date: Mar. 29, 2000

§ 102(e) Date: Mar. 29, 2000

(87) PCT Pub. No.: WO99/51513

PCT Pub. Date: Oct. 14, 1999

(30) Foreign Application Priority Data

Apr. 3, 1998 (DE) ............................................. 198 14 941

(51) Int. Cl.[7] .................................................. B66F 9/06
(52) U.S. Cl. ............................ 414/667; 414/663; 701/24; 701/50; 180/169; 187/222
(58) Field of Search .................................. 414/631–636, 414/641, 642, 663–667; 701/23–26, 50; 180/168, 169; 187/222, 224, 231, 237

(56) References Cited

U.S. PATENT DOCUMENTS 4,354,568 * 10/1982 Griesenbrock ...................... 701/50 X
4,566,032 * 1/1986 Hirooka et al. ................. 180/169 X
4,595,331   6/1986 Thompson et al. .
5,938,710 * 8/1999 Lanza et al. ........................... 701/50

FOREIGN PATENT DOCUMENTS 29 30 569   2/1981 (DE) .
37 02 918   8/1988 (DE) .
296 20 342  4/1998 (DE) .
2 725 436   4/1996 (FR) .

* cited by examiner

*Primary Examiner*—Robert P. Olszewski
*Assistant Examiner*—Gerald J. O'Connor
(74) *Attorney, Agent, or Firm*—Browdy & Neimark

(57) ABSTRACT

A satellite vehicle for moving pallet units (P) in and out of storage with transportation vehicles (F) is configured as a motor-driven lift-truck (1) with several parallel, adjacent and height adjustable fork arms (2). The position of said fork arms (2) in relation to the pallet can also be adjusted. At least two fork arms (2) are mounted on the lift-truck (1) in such a way that they can be displaced laterally, crosswise to the longitudinal direction of the arms. All of the fork arms (2) have pallet-receiving elements (3) which float crosswise to the longitudinal direction of the arms. The lift-truck (1) and the fork arms (2) are provided with ultrasound sensors (17, 18) for measuring and correcting the direction of travel and the lift-truck (1) is equipped with a rotation rate sensor (19) for measuring the angle and a cable drum (5) with a power and signal cable (6) for supplying propulsive power and for exchanging signals for measuring displacement.

20 Claims, 3 Drawing Sheets

Figure 3:
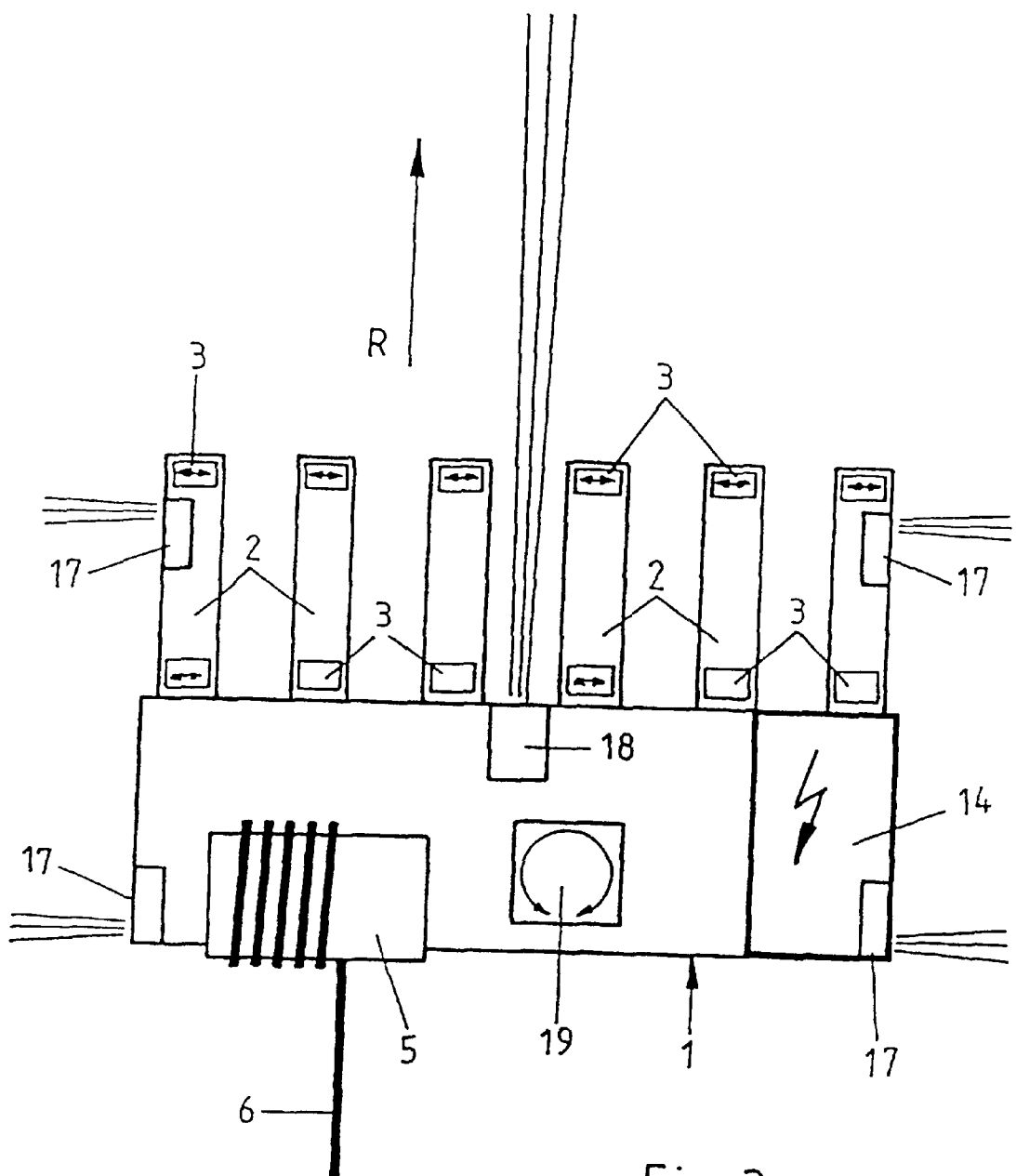

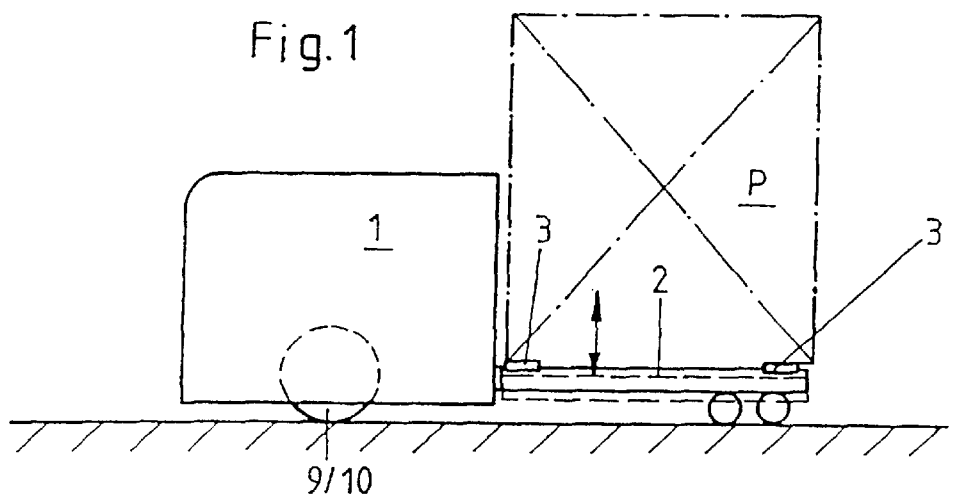
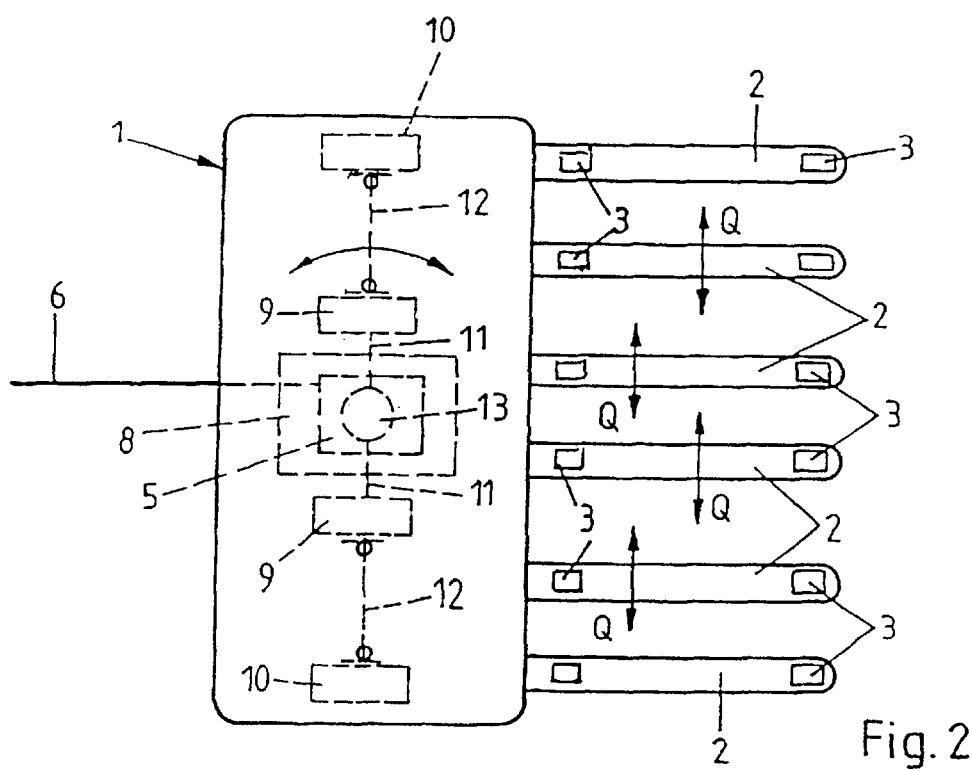

SATELLITE VEHICLE FOR MOVING PALLET UNITS IN AND OUT OF STORAGE WITH TRANSPORTATION VEHICLES

CROSS REFERENCE TO RELATED APPLICATION

The present application is the national stage under 35 U.S.C. 371 of PCT/EP99/02125, filed Mar. 29, 1999.

BACKGROUND OF THE INVENTION

1. Field of the Invention

The invention relates to a satellite vehicle for moving pallet units (loading units) into and out of storage with transport vehicles, containers or the like, as defined in the preamble to claim 1.

2. Description of the Related Art

In a satellite vehicle known from DE 296 20 342 U1, the fork arms can be displaced in their longitudinal direction in order to receive pallets longitudinally and transversely, or folded up in order to receive pallets transversely or longitudinally.

BRIEF SUMMARY OF THE INVENTION

It is the object of the invention to provide a simple alternative to the prior art, which allows the fork arms to be adapted to different pallet systems, and in which the fork arms can receive the pallets such that they can be deflected, with respect to the side boundaries of the transport vehicles, during loading and unloading without being damaged, and in which an optimum navigation for the course and the course correction of the satellite vehicle are provided.

In accordance with the invention, this object is accomplished by the characterizing features of claim 1. The dependent claims disclose embodiment features that represent advantageous and beneficial modifications of the solution.

The satellite vehicle according to the invention is equipped with at least two, but preferably more, laterally-adjustable fork arms, so the fork arms can accommodate different pallet systems, which means that the satellite vehicle can receive and transport different pallet types.

Furthermore, the fork arms are equipped with floating pallet-receiving elements that permit a limited movement of the pallets transversely to the longitudinal direction of the forks, so the pallets can be deflected when they come into contact with the side boundaries of the transport vehicle during loading and unloading, which precludes damage to both the transport vehicle and the loading item.

The satellite vehicle is further provided with a plurality of ultrasound sensors, a steel-cable reel, in which the energy and signal cables are wound, an integrated switch cabinet and an electronic compass, so a measurable, correctable and problem-free course of the satellite vehicle can be achieved with respect to the vehicle to be loaded and unloaded, even if the loading surface is misaligned or tilted. The ultrasound sensors employ reference edges to take measurements, and the signals are supplied directly to the switch cabinet for evaluation. The energy and signal cable that unwinds from the cable reel serves simultaneously in distance measurement. A further advantage of the invention is the drive connection from the center drive motor to four drive and steering wheels, with the inside wheels being connected via a drive shaft to the drive motor and the two lateral wheel pairs being coupled to a respective cardan shaft, so a central pivoting bolster brings all four of the wheels into the steering position, which results in a low-wear steering.

The entire satellite vehicle has a relatively simple and inexpensive design, and has an widely-variable operating mode, both in receiving the different pallet systems and in moving the load, so the satellite vehicle helps to increase the efficiency of moving goods in and out of storage.

BRIEF DESCRIPTIONS OF THE DRAWINGS

Figure 4:
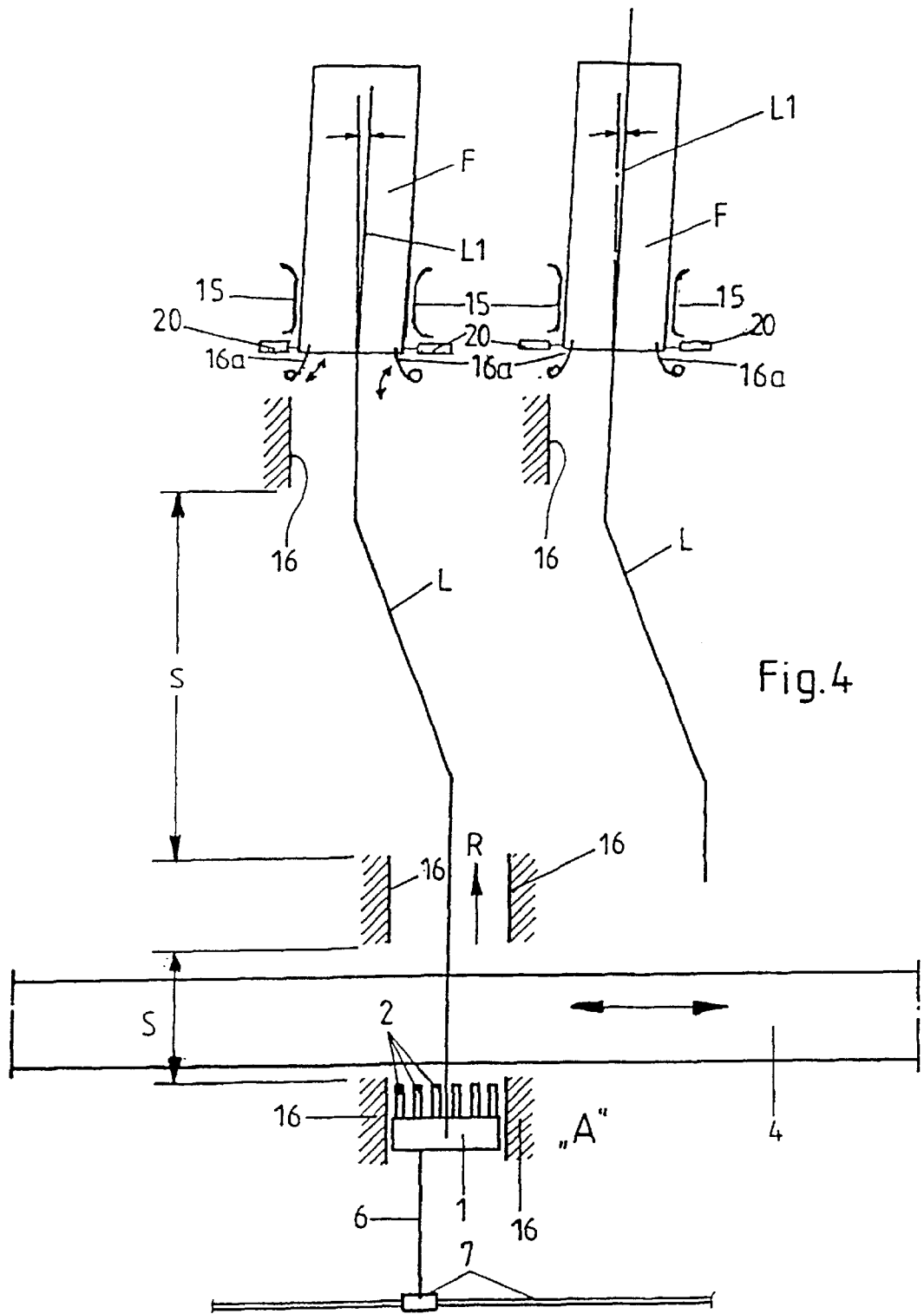

An embodiment of the invention is described below, with reference to the drawings, which show in:

FIG. 1 a schematic side view of a pallet lift truck with a pallet unit that has been received by one of the fork arms;

FIG. 2 a schematic plan view of the pallet lift truck with six fork arms;

FIG. 3 a schematic plan view of the pallet lift truck with floating pallet-receiving elements on the fork arms, and sensors, as well as an electronic compass, a switch cabinet and a cable reel; and FIG. 4 a schematic plan view of the pallet lift truck in an initial position, a cross-conveyor and two offset transport vehicles and reference edges for controlling the travel path of the pallet lift truck.

DETAILED DESCRIPTION OF THE PREFERRED EMBODIMENT

The non-rail loading and unloading device for automatic rear and lateral loading and unloading of the loading surface of transport vehicles (F), such as trucks, trailers or containers, with loading units (P)—pallet units (P)—is embodied as a satellite vehicle (loading vehicle) in the form of a motor-driven pallet lift truck (1) having a plurality of parallel fork arms (2) that can be adjusted in height (raised and lowered) and changed in position relative to the pallet (P) or pallet units (P).

At least two fork arms (2) are seated on the lift truck (1) to travel laterally, transversely to the longitudinal direction of the forks, so the arms can be adapted to different pallet systems. It is preferable to provide a plurality of fork-arms (2) that can be laterally displaced, individually or in pairs.

The lift truck (1) is provided with six fork arms (2), of which the two outside fork arms (2) are stationary, and the four interposed fork arms (2) can travel laterally, individually or in pairs, in the two transverse directions (Q).

The fork arms (2) can be continuously adjusted in a limited region in the transverse direction, either hydraulically or pneumatically, by at least one electric motor or pressure-medium motor. The laterally-traveling fork arms (2) are seated to be displaced at or in guides of the lift truck (1), and are fixed in their respective position by their adjusting motor. The fork arms (2) have floating pallet-receiving elements (3) with centering elements, the receiving elements traveling in a limited, linear fashion back and forth, transversely to the longitudinal direction of the arms.

These pallet-receiving elements (3) are formed by linear modules, and the centering elements are formed by restoring members, such as restoring springs, electric or pressure-medium drives or the like.

Each fork arm (2) has a floating linear module (3) at its front and rear ends.

The fork arms (2) can also be equipped with hinged tactile stops, so shorter pallets (P) can also end flush with the front edge of the forks (2). The mechanical hinged stops can be actuated mechanically by the lateral displacement of the forks, and separately via a motor or hydraulically.

During the loading process, the loading units (P) may come into lateral contact with the boundaries of the loading region due to permissible deviations from the course of the lift truck or the lateral boundaries (side walls, planks) of the transport device (F), and, under excessive pressure, the transport vehicle (F) and the loading unit (P) may be damaged at the contact point. The loading units (P) can be laterally displaced transversely and to a limited extent by the "floating" pallet-receiving surfaces (3) disposed transversely to the direction of the forks, which considerably decreases the contact pressure between the loading units (P) and the contact surface. If the lateral pressure eases, the restoring members driven by an electric motor, or pneumatically or hydraulically, or by oppositely-located springs, again center the loading unit (P) in the center position.

To service numerous loading gates with one pallet lift truck (1), the lift truck (1) is transported on the shortest path into several loading positions on a cross-conveyor (4), such as a slat conveyor, chain conveyor or belt conveyor. This cross-conveyor (4) also transports the loading units (P) into the transfer position to the lift truck (1).

The cross-conveyor (4) as a goods conveyor can be embodied as a circulating belt (return run recessed into the floor) and a belt that is alternately wound and unwound.

The lift truck (1) has an integrated cable reel (5) with electrical supply and control-signal cables (6); this cable is connected to a trailing-cable system or a power-chain system (7) for the transverse travel of the lift truck (FIG. 4).

The pallet lift truck (1) is supplied with power and control signals via the integrated cable reel (5). The fact that the cable reel (5) is secured to the lift truck (1) considerably reduces the wear to the cable sheathing due to the unwinding effect. The transverse travel of the lift truck (1) necessitates that the cable feed to the truck (1) also travel transversely.

More than one cable reel (5)—for example, two—with a steel cable can also be used to divide the power feed, in which case thinner cables (6) can also be used. The cables (6) are held taut through winding and unwinding by stop motors.

The cable can be fed via a trailing-cable system (7) running parallel to the cross-conveyor (4), or via a power-chain system (7).

A wheel-and-disk drive supports the movement of the trailing cable. The cable (6), which is positioned at an incline to the side, effects the start and stop of this movement by actuating a switch. The belt movement pulls the cable (6) at an incline; when the cable (6) is at a slight incline, a switch is actuated, which initiates the friction drive of the trailing cable (6).

The lift truck (1) includes a central drive motor (8) for driving four running wheels (9, 10) that are disposed in pairs on both sides of the drive motor (8); the two inside running wheels (9) are connected to the drive motor (8) via a drive shaft (11), while the inside and outside running wheels (9, 10)—pair of running wheels—are respectively coupled by a cardan shaft (12) All four of the running wheels (9, 10) are rotated together about a pivoting bolster (13) of the lifting truck (1) for steering (FIG. 2). The central drive (8) receives its drive power via the cable reel (5). This wheel connection distributes the driving force to a plurality of wheels (9, 10), resulting in a better distribution of force onto the driving background.

Instead of a central drive (8), the two outside wheel pairs (10) can be provided with a respective drive (8). The vehicle control effects the synchronization control. Different actuation of the two drives can also influence the turning circle of the vehicle.

The rotatable seating of the driving and support wheels (9, 10) can also be vertically displaced (through hydraulic or spring pressure) for adaptation to the floor conditions (differences in surface levels). The pressing force can be varied corresponding to the requirements.

The lift truck (1) has an integrated switch cabinet (1 [sic]) for direct signal processing; in the event of a centering or tilting misalignment of the transport vehicle (F) with respect to the loading gate, the cabinet receives the measured misalignment as a signal for correcting the travel direction of the lift truck (1).

When the transport vehicle (F) backs up to the loading gate, a lateral centering misalignment of the loading surface of the transport vehicle (F) with respect to the center of the loading gate may occur, despite the provision of shunting elements (15), such as approach guides, etc.

This misalignment is measured by ultrasound sensors (20) mounted to the side in front of the gate, in connection with reference edges (16), and is reported to the lift-truck control (14) for correcting the travel direction.

This direct signal processing in the integrated switch cabinet (14) results in the following advantages: the shortest-possible sensor, signal and motor lines, and therefore faster signal processing, a minimum number of conductor bunches in the supply cable (6) and less complicated wiring.

FIG. 4 shows the course correction (in the direction of travel R) of the lift truck (1) from the initial position (A) to the misaligned transport vehicle (F)—namely, its loading surface—in the path of travel (L), and around the corrected travel line (LI); reference edges (16) for the ultrasound sensors are associated with the transport vehicle (F) and the lift truck (1), in front of and behind the cross-conveyor (4). The reference edges (16a), which can be pivoted into the loading opening of the transport vehicle (F), function simultaneously as docking aids for the loading vehicle.

For navigating the satellite vehicle, the lift truck (1) and the fork arms (2) are provided with lateral ultrasound sensors (17); for measuring the straight-line travel of the lift truck (1), the truck is provided with an ultrasound sensor (18) that acts in the direction of travel (R); and the truck is provided with a rotation-rate sensor (19) for angular measurement.

The lift truck is navigated by way of ultrasound sensors (17, 18) or induction loops; the distance measurement is based on the unwinding supply cable (6); and the electronic compass (rotation-rate sensor 19) takes the angular a measurement. This achieves an optimum directional stability, and the compensation of deviations of the loading-surface periphery from the ideal contour, and of position errors in the transport vehicle (F) and uneven areas in the floor. It is also possible for free surfaces (paths S) to be traversed and for cornering to be predefined.

Distance sensors can also take the distance measurement by means of magnets that are recessed into the floor.

The lift truck (1) can travel freely on the paths (S), in the direction of travel (R), between the respectively front and rear reference edges (16) on both sides of the truck.

At the front reference edges (16), the sensors (17) emit a log-off signal for free further travel (S), and, at the rear reference edges (16), a log-on signal is emitted, causing the lift truck (1) to be steered back on course by the switch cabinet (16 [sic]).

The navigation process for the lift truck employs the technique of virtual lane lines- A path of travel is predetermined in points in Cartesian coordinates that have been determined by a CAD program, a learning process or another method. In addition to these coordinates, reference coordinates are predetermined, which can be used by the lift truck (1) to ascertain a deviation of its position, as calculated from sensor values, from the actual position. From the lift-truck control, the sensors (17) determine lateral path boundaries (16) for referencing.

While the lift truck (1) travels, its instantaneous position is continuously calculated from the traversed path and the vehicle rotation. The instantaneous position of the lift truck (1) calculated in this manner is compared to the predetermined travel path, and the deviation is determined, and thus the path segment in which the lift truck (1) is presently located.

The lift truck (1) is driven empty and, according to the above-described method, a tilted position of an empty transport vehicle (F) to be filled is ascertained, and is traversed as the current travel route for loading. When a transport vehicle (F) is unloaded, the contours of the loading surface are scanned in parts over the course of the unloading process; the misaligned position of the transport vehicle (F) is thus determined step by step.

The trailing cable (7) disposed parallel to the cross-conveyor (4) can also be mounted above the opening of the loading gate, eliminating the need for space behind the loading vehicle (F).

What is claimed is:

1. A satellite vehicle for moving pallet units in and out of storage with transport vehicles, having a motor-driven lift truck with a plurality of parallel, adjacent fork arms that can be adjusted in height and changed in position relative to the pallet, characterized in that at least two fork arms (2) are seated on the lift truck (1) to travel laterally, transversely to their longitudinal direction;

all of the fork arms (2) are provided with pallet-receiving elements (3) that float transversely to the longitudinal direction of the forks; and the lift truck (1) and the fork arms (2) are provided with ultrasound sensors (17, 18) for measuring and correcting the direction of travel, and the lift truck (1) is provided with a rotation-rate sensor (19) for angular measurement, and with a cable reel (5) with a power and signal cable (6) for supplying current to the drive and for exchanging signals, as well as for measuring distance.

2. The satellite vehicle according to claim 1, characterized in that a plurality of fork arms (2) can be laterally displaced, individually or in pairs.

3. The satellite vehicle according to claim 1, characterized in that six fork arms (2) are provided on the lift truck (1), of which the two outside fork arms (2) are stationary and the four interposed fork arms (2) can travel laterally, individually or in pairs, in the two transverse directions (Q).

4. The satellite vehicle according to claim 3 characterized in that the laterally-traveling fork arms (2) can be transversely adjusted via an electric motor, or pneumatically or hydraulically.

5. The satellite vehicle according to claim 1, characterized in that the fork arms (2) are provided with floating pallet-receiving elements (3) with centering elements, the receiving elements traveling back and forth in a limited, linear fashion transversely to the longitudinal direction of the forks.

6. The satellite vehicle according to claim 5 characterized in that the pallet-receiving elements (3) are formed from linear modules, and the centering elements are formed from restoring members, such as restoring springs, or electric drives or pressure-medium drives.

7. The satellite vehicle according to claim 1 characterized in that each fork arm (2) has a floating linear module (3) at its front and rear ends.

8. The satellite vehicle according to claim 1 characterized by a cross-conveyor (4), such as a slat conveyor, chain conveyor or belt conveyor, that transports the satellite vehicle (1) into numerous loading positions, and transports pallet units (P) into the transfer position to the satellite vehicle (1).

9. The satellite vehicle according to claim 8, characterized in that the lift truck (1) has an integrated cable reel (5) with electrical supply cables and control-signal cables (6), and these cables (6) are connected to a trailing-cable system or power-chain system (7) for the transverse travel of the lift truck.

10. The satellite vehicle according to claim 9, characterized in that, for navigating the satellite vehicle, the lift truck (1) and the fork arms (2) are provided with lateral ultrasound sensors (17); for measuring the straight-line travel of the lift truck (1), the truck 18 provided with an ultrasound sensor (18) that acts in the direction of travel (R); and the truck is provided with a rotation-rate sensor (19) for angular measurement.

11. The satellite vehicle according to claim 1 characterized in that the lift truck (1) has an integrated cable reel (5) with electrical supply cables and control-signal cables (6), and these cables (6) are connected to a trailing-cable system or power-chain system (7) for the transverse travel of the lift truck.

12. The satellite vehicle according to claim 1 characterized in that the lift truck (1) has a central drive motor (8) for driving four running wheels (9, 10) that are disposed in pairs on both sides of the drive motor (8), the two inside running wheels (9) being connected to the drive motor (8) by way of a drive shaft (11), and the inside and outside running wheels (9, 10)—running-wheel pair—being coupled by a cardan shaft (12), and all four running wheels (9, 10) being able to rotate together about a pivoting bolster (13) of the lift truck (1) for steering.

13. The satellite vehicle according to claim 12 characterized in that the two outside wheel pairs (10) of the lift truck (1) are coupled to a respective drive (8).

14. The satellite vehicle according to claim 12 characterized in that the rotational seating of the driving and support wheels (9, 10) can be vertically displaced in the lift truck (1) by hydraulic or spring pressure for adaptation to the floor conditions.

15. The satellite vehicle according to claim 1 characterized in that the lift truck (1) has an integrated switch cabinet (14) for direct signal processing, and, in the event of a centering or tilting misalignment of the transport vehicle (F) with respect to the loading gate, the cabinet receives the measured misalignment, as a signal for correcting the course of the lift truck (1), from ultrasound sensors (20) mounted to the side in front of the gate, in connection with reference edges (16).

16. The satellite vehicle according to claim 1 characterized in that, for navigating the satellite vehicle, the lift truck (1) and the fork arms (2) are provided with lateral ultrasound sensors (17); for measuring the straight-line travel of the lift truck (1), the truck is provided with an ultrasound sensor (18) that acts in the direction of travel (R); and the truck is provided with a rotation-rate sensor (19) for angular measurement.

17. The satellite vehicle according to claim 1 characterized in that lateral reference edges (16a), which can be pivoted into the loading opening of the transport vehicle (F), function simultaneously as mobile docking aids for the transport vehicle (F).

18. The satellite vehicle according to claim 1 characterized in that the fork arms (2) have hinged tactile stops, so shorter pallets (P) can also end flush with the front edge of the fork arms (2).

19. The satellite vehicle according to claim 1 characterized in that the lift truck (12) has two cable reels (5) with steel cables, and the power feed is divided onto thinner supply cables, and the cables (6) are held taut by stop motors during winding and unwinding.

20. The satellite vehicle according to claim 1 characterized in that the movement of the trailing cable is supported by a wheel-and-disk drive, with the inclined cable (6) effecting the start and stop of this movement by actuating a switch.

* * * * *